United States Patent [19]

Itzhak

[11] Patent Number: 4,997,583

[45] Date of Patent: Mar. 5, 1991

[54] METHOD FOR PROTECTING CARBON STEEL FROM CORROSION IN HEAVY BRINES

[75] Inventor: David Itzhak, Omer, Israel

[73] Assignee: Bromine Compounds Ltd., Beer-Sheva, Israel

[21] Appl. No.: 371,286

[22] Filed: Jun. 23, 1989

[30] Foreign Application Priority Data

Jun. 29, 1988 [IL]  Israel ......................................... 86913

[51] Int. Cl.$^5$ .......................... C23G 5/02; E21B 43/00
[52] U.S. Cl. ................................ 252/8.555; 252/79.2; 252/86; 252/389.1; 252/359.54; 252/390; 252/394; 252/400.54; 422/12; 422/16
[58] Field of Search ...................... 252/8.555, 79.2, 86, 252/389.1, 389.54, 390, 394, 400.54; 422/12, 16

[56] References Cited

U.S. PATENT DOCUMENTS

| | | | |
|---|---|---|---|
| 1,877,504 | 9/1932 | Grebe et al. | 252/390 |
| 2,068,868 | 1/1937 | Pier et al. | 252/390 |
| 2,319,667 | 5/1943 | Edmunds | 252/389.54 X |
| 2,549,430 | 4/1951 | Crittenden | 252/390 |
| 2,613,131 | 10/1952 | Barnes et al. | 252/389.54 X |
| 2,635,997 | 4/1953 | Rohrback et al. | 252/8.555 |
| 2,803,604 | 8/1957 | Meighen | 252/390 X |
| 3,077,454 | 2/1963 | Monroe | 252/8.553 X |
| 3,655,571 | 4/1972 | Tedeschi et al. | 252/148 X |
| 3,668,137 | 6/1972 | Gardner | 252/149 X |
| 4,292,183 | 9/1981 | Sanders | 252/8.551 |

OTHER PUBLICATIONS

Hudgins et al., Article in *Oil and Gas Journal*, vol. 59, Jul. 24, 1961, pp. 91-96.

*Primary Examiner*—Robert L. Stoll
*Assistant Examiner*—Chhaya Sayala
*Attorney, Agent, or Firm*—Michael N. Meller

[57] ABSTRACT

A method is described for the inhibition of corrosion of carbon steels due to heavy brine corrosive attack, which employs $As^{+z}$-containing composition.

Corrosion inhibiting compositions comprising $As^{+z}$, alone or in admixture with urea as a synergistic inhibitor, are also described.

18 Claims, No Drawings

METHOD FOR PROTECTING CARBON STEEL FROM CORROSION IN HEAVY BRINES

FIELD OF THE INVENTION

The present invention is directed to a method for protecting carbon steel from corrosion attack due to heavy brine corrosive behavior. More particularly, the invention concerns the use of $As^{+z}$-based corrosion inhibitors in clear brines, particularly heavy brines containing bromides and/or chlorides of Zn, Ca, Na or K, more particularly heavy $Zn,Ca/Br_2$ (or $Cl_2$) brines.

BACKGROUND OF THE INVENTION

Heavy brines are useful in a variety of applications, particularly as "clear brines" in oil wells drilling. These brines are used, e.g., instead of drilling mud and for well closure. Therefore, they must be both heavy and possess a high boiling point. Furthermore, they must be substantially free of precipitates, in order not to clog pores in the ground from which gas, oil and the like materials are liberated. Such brines normally have a density of the order of about 14–23 ppg (pounds per gallon). A density of 21 ppg represents, for instance, a $Zn,Ca/Br_2$ brine with 75% $ZnBr_2$. Such brines, which can be provided in different $ZnX_2:CaX_2:NaX_2:KX_2$ ratios, (X representing Br or Cl) are known to be corrosive to carbon steel, its corrosive activity increasing with increasing $Zn^{++}$ ion concentration. Throughout this specification the term "carbon steel" is intended to embrace also what is commonly known as "drilling steels".

High $Zn^{++}$ brines are the most corrosive, because $Zn^{++}$ requires low pHs and the corrosion mechanism of carbon steel is affected by the pH, the corrosion being enhanced by a reduction in pH. Such brines have a diluted pH of 6 or less. "Diluted pH" values are those values obtained after diluting a brine tenfold in water. This corrosive activity can be appreciated from Table 1 below, which exemplifies this effect. In order to study the corrosion effect of such brines, six different brines were prepared, using a commercial brine (ex Bromine Compounds Limited, Israel) with a density of 19.2 ppg, and mixing it in different proportions with a 52 wt % $CaBr_2$ brine (density: 14.2 ppg). As will be apparent to a person skilled in the art, the density of the brine is a function of the $ZnX_2:CaX_2:NaX_2:KX_2$ ratio, as well as of the different species (chlorides and/or bromides) present in the brine.

EXPERIMENTAL EVALUATION

Six brines were prepared, as detailed in Table 1, the contents of which ranged from 0% $CaBr_2$–75% $ZnBr_2$, to 52% $CaBr_2$–0% $ZnBr_2$. Samples of 1020 carbon steel (St-37) were immersed in the brine which was kept in an open vessel at its boiling temperature. The corrosion rate at a given time was measured according to weight change, visual and microscopic inspections. Test samples, throughout this specification, have the dimensions 25×50×1 mm.

As will be apparent to a person skilled in the art, the data of Table 1 conclusively show an increase in corrosion rate with increasing $ZnBr_2$ content, while commercial brines, with a density of around 19 ppg, will have a very high corrosion rate, in the order of hundreds of mpy (millinch per year).

It is therefore clear that it is extremely desirable to find a way to protect carbon steel from this corrosion attack, by at least substantially reducing the corrosion rate.

SUMMARY OF THE INVENTION

It has now been found, and this is an object of the present invention, that it is possible to protect carbon steel, and substantially to reduce the corrosion attack of carbon steel in the corrosive environment existing in clear brines, by employing trace amounts of $As^{+z}$ as a corrosion inhibitor. By $As^{+z}$ is meant any cationic form of arsenic having a valence between 1 and 5.

It has also been found, and this is another object of the invention, that inhibitors according to the invention, which contain $As^{+z}$ and urea, are surprisingly effective, particularly in protecting carbon steel against edge corrosion.

It has further been found, and this is still another object of the invention, that it is possible to obtain the aforesaid result, and at the same time to maintain a substantially clear solution even after long periods of time. This result is surprising since commercially available and commonly employed corrosion inhibitors, while inhibiting carbon steel attack, result in hazy, milky or colored solutions. Thus, for instance, the known inhibitor NaCNS leads in a short time to the formation of a milky suspension. Other inhibitors may cause brown-red or white precipitates ($Sb_4O_6$), unclear solutions (Bi or Te powder) or reddish precipitates (A 205 1.0%, Exxon Co.). Because of the use made of heavy brines in oil drilling, it is understood that a clear solution presents considerable advantages. While the invention is applicable to all carbon steels, it should be understood that it is of particular importance for applications which require special carbon steels, particularly special oil field steels, such as N-80, p-110 and J-55.

The method for protecting carbon steel from corrosion attack due to heavy brines corrosive behavior, according to the present invention, comprises adding to the brine an inhibiting effective amount of $As^{+z}$. According to a preferred embodiment of the invention, this is achieved by adding to the brine an inorganic salt, such as $As_2O_3$, $AsBr_3$, $Na_2AsO_3$ or $As_2O_5$, but any other way to provide $As^{+z}$ ions, such as their generation in situ, is permissible.

Generally, the said minimal inhibiting effective amount of $As^{+z}$ will be at least 200 ppm. This value, however, may be considerably reduced if the brines are employed at low temperatures. As will be easily understood by an expert in this field, the temperature of the brine plays an important role on the corrosive behavior thereof toward carbon steel. This being so, throughout this specification reference is made to values and conditions which allow for the use of heavy brines at or near their boiling point. The skilled engineer will easily appreciate the effect of cooling the brine to lower temperatures on its corrosive behavior.

According to another preferred embodiment of the invention, urea is provided in the brine in an amount of between about 0.5% to about 1%, based on the weight of the brine, to provide a synergistic mixture of $As^{+z}$ and urea. As will be apparent to a person skilled in the art, concentrations of $As^{+z}$ and of urea can be adjusted so as to provide the most convenient synergistic inhibiting mixture for a given brine and operating conditions.

It should be understood that the use of an amount of inhibitor which is lower than the required minimal inhibiting amount will result in the crevice corrosion attack, or other localized corrosion such as intergranular or edge attack, of the carbon steel. On the other hand it has been found that it is possible to employ very high $As^{+z}$ concentrations, e.g., 1%, while maintaining an effective inhibitory action. This as will be apparent to a person skilled in the art, is an important advantage of the invention, because other commonly employed inhibitors, such as NaSCN or $NH_4SCN$, have a relatively narrow range of concentrations which can be safely employed. Addition of too high amounts will result, with such inhibitors of the art, in an overtreatment that will lead to an enhanced corrosion of the carbon steel.

As herein stated, different densities of the brine can be obtained by mixing different bromide salts in different proportions, and the minimal amount of inhibitor required will also be influenced by the type of brine. When the density of the brine is about 16 pounds per gallon or less, $As^{+z}$ is preferably added in an amount of about 200 ppm. When the density of the brine is comprised between about 16 and about 18 pounds per gallon however, the preferable amount of $As^{+z}$ added increases, and is about 300 ppm.

When the heaviest brines are employed, again the amount of inhibitor which will produce satisfactory results will increase. When the density of the brine is about 18.6 pounds per gallon or less, $As^{+z}$ is preferably added in an amount of about 400 ppm, and when the density of the brine is about 19 pounds per gallon or higher, $As^{+z}$ should preferably be added in an amount of at least 600 ppm. One of the preferred forms for providing $As^{+z}$ is $As_2O_3$.

For practical purposes, it may be convenient to provide $As_2O_3$ (or another $As^{+z}$ inhibitor) in formulation with other materials, such as inert carriers. Compositions for inhibiting the corrosive attack of heavy brines, which comprise an inhibiting effective amount of a compound which liberates $As^{+z}$, or which otherwise react to provide it, are of course also encompassed by the invention.

Another important factor to be taken into account is that all references to minimal inhibitory amounts made herein refer to "virgin" steels. Carbon steel which has been treated before according to the invention may require lower amounts of inhibitor in order to prevent corrosive attack. The reason for this is believed to be that As precipitates on the surface and provides a protective layer, the thickness of which increases with time and exposure to the inhibitor.

It should further be understood that the effectiveness of the inhibition is dependent on the value of the diluted pH of the brine. At diluted pHs lower than 5.3–5.6 the tendency of the carbon steel to undergo crevice corrosion will increase.

The above results, characteristics and advantages of the invention will be further illustrated by the following examples.

EXAMPLE 1

Seven different brines were prepared and tested as hereinbefore described. The tested brines had densities 14.2, 15, 16, 17, 18, 18.6 and 19.2 ppg. Each brine was separately tested without an additive, with 100 ppm, 200 ppm, 300 ppm and 400 ppm of $As_2O_3$ inhibitor (calculated as $As^{+3}$ ion concentration), and corrosion rates were measured after 7 days and after 30 days. The results are set forth in Tables 2 and 3 below. The steel tested was St-37 carbon steel.

The results of these tables are self-explicative. It is seen that there is a minimal, critical, inhibitor concentration necessary for preserving carbon steel from sensible attack. This value, the so-called MIC (Minimal Inhibitory Concentration) varies with brine density, and is about 200 ppm for brines up to 16 ppg, about 300 ppm for brines having densities comprised between 16 and 18 ppg, about 400 ppm for 18.6 ppg, and more than 600 ppm $As_2O_3$ inhibitor for 19.2 ppg.

EXAMPLE 2

$AsBr_3$ was prepared by reacting stoichiometric amounts of $As_2O_3$ and HBr. St-37 carbon steel was tested in an open vessel during one month in a 19.2 ppg brine, at 155° C. 2500 ppm $AsBr_3$ were added to give about 600 ppm $As^{+3}$ in the brine. The mean corrosion rate was less than 5 mpy.

EXAMPLE 3

Example 2 was repeated, but using $Na_2AsO_3$ (obtained by preparing a 30% aqueous solution of equivalent amounts of $As_2O_3$ and NaOH). The results obtained were as in Example 2.

EXAMPLE 4

A series of tests was run with different carbon steels. The carbon steels tested were P-110, N-80, J-55 and St-37, and the tests were run in an autoclave, using a 19.2 ppg $Zn,Ca/Br_2$ brine, at 230° and at a charge pressure of 500 psi of nitrogen. The brine also contained in all cases 1000 ppm $As_2O_3$, and the tests were run during 7 days in all cases.

The mean corrosion rate varied between 7 and 14 mpy, the brines remained clear and no color change was noted. The "charge pressure" is defined as the pressure which was generated at the time the autoclave was charged at ambient temperature, regardless of the actual value of the pressure in the autoclave at any other time.

EXAMPLE 5

The influence of $(NH_2)_2CO$ addition to an $As^{+z}$-containing brine was studied by adding $As_2O_3$ and $(NH_2)_2CO$ to a 19.2 ppg $Zn,Ca/Br_2$ brine, and testing its corrosion behavior in an aging cell with N-80, J-55, P-110 and ST-37 steels for 7 days. The conditions and results are shown in Table 4 below. The beneficial effect of urea addition is self-evident from the results in Table 4.

The above description and examples have been given for the purposes of illustration, and are not intended to be limitative. Many variations can be effected in the invention, such as addition of other additives, inhibitors or the like, all without exceeding the scope of the invention.

TABLE 1

Corrosion Rate on Carbon Steel 1020 By Zn,CaBr$_2$ Boiling Brines

| Brine Composition [wt %] | | Brine Density [PPG] | Corrosion Rate [mpy] Days | | | | | |
|---|---|---|---|---|---|---|---|---|
| CaBr$_2$ | ZnBr$_2$ | | 1/6 | 1 | 2 | 4 | 7 | 14 |
| — | 75 | 20.2 | 3350 | 2240 | 1840 | 1420 | 870 | 735 |
| 10 | 60 | 18.6 | 1630 | 757 | 700 | 587 | 520 | 395 |
| 20 | 46 | 17.4 | 720 | 447 | | 305 | 209 | |
| 30 | 32 | 16.2 | 74 | 44 | 28 | 31 | 26 | |
| 40 | 17 | 15.2 | 35 | 24 | 28 | 26 | 26 | |
| 52 | — | 14.2 | | | | | 5 | 3 |

TABLE 2

The influence of As$_2$O$_3$ Content on the Corrosion Behavior of St-37 Carbon Steel After 7 Days of Exposure, in Zn,Ca/Br$_2$ Heavy Brine Solutions.

| Density ρ (ppg) | Boiling temper. t (°C.) | No. additives | Corrosion Rate (mpy) | | | | | | | |
|---|---|---|---|---|---|---|---|---|---|---|
| | | | 100 ppm* | Remarks | 200 ppm* | Remarks | 300 ppm* | Remarks | 400 ppm* | Remarks |
| 14.2 | 125 | 3 | 0.5 | Sl. pitting, crevice, clear fluid | 1.0 | Sl. pitting, crevice clear fluid | + | Protective deposit metallic appearance, clear fluid | + | Protective deposit mettalic app. clear fluid |
| 15 | 127 | 26 | 0.1 | Sl. pitting, crevice, clear fluid | 0.1 | Sl. pitting, crevice clear fluid | + | Protective deposit metallic app. clear fluid | + | Protective deposit metallic app. clear fluid |
| 16 | 128 | 26 | 1.0 | Sl. pitting, crevice, clear fluid | 0.2 | Sl. pitting, crevice clear fluid | + | Protective deposit metallic app. clear fluid | + | Protective deposit metallic app. clear fluid |
| 17 | 130 | 209 | 18 | General attack, clear fluid with small amount of PPT | 0.6 | Very sl. pit., crevice, sl. edge cor., clear fluid | + | Protective deposit metallic app. clear fluid | + | Protective deposit metallic app. clear fluid |
| 18 | 138 | — | 112 | Sever general attack, heavy brown PPT | 1.0 | Very sl. pit., crevice, sl. edge cor., clear fluid | + | Protective deposit metallic app. clear fluid | + | Protective deposit metallic app. clear fluid |
| 18.6 | 141 | 520 | 348 | Severe general attack, heavy brown PPT | 3.0 | Sl. pit., crevice cor. clear fluid | + | Protective deposit metallic app. clear fluid | + | Protective deposit metallic app. clear fluid |
| 19.2 | 145 | 650 | 320 | | | | 15 | pitting | 10 | Sl. Pitting, Crevice |

+ Increase in weight
*Inhibitor concentration (as As$^{+Z}$ ion)

TABLE 3

The influence of As$_2$O$_3$ Content on the Corrosion Behavior of St-37 Carbon steel After 30 Days of Exposure, in Zn,Ca/Br$_2$ Heavy Brine Solutions.

| Density of solution ρ (ppg) | Boiling temper. t (°C.) | Corrosion Rate (mpy) | | | | | | | |
|---|---|---|---|---|---|---|---|---|---|
| | | 100 ppm | Remarks | 200 ppm | Remarks | 300 ppm | Remarks | 400 ppm | Remarks |
| 14.2 | 125 | 0.9 | Sl. pit., crevice, clear fluid, tendency to crevice | 0.5 | V. sl. pit., crevice con. clear fluid, tendency to crevice | 0.5 | V. sl. attack, tendency to crevice, clear fluid | 0.4 | V. sl. attack, crevice, clear fluid |
| 15 | 127 | 0.3 | Sl. Pit., crevice, clear fluid, tendency to crevice | + | Protective deposit, metallic appearance, clear fluid, tendency to crevice | + | Heavy protective deposit, metallic app., tendency to crevice, clear fluid | + | Heavy protective deposit, metallic app., tendency to crevice con., clear fluid |
| 16 | 128 | 0.5 | Sl. pit., crevice, clear fluid, tendency to crevice | + | Protective deposit, metallic app., clear fluid, tendency to crevice | + | Heavy protective deposit, metallic app., tendency to crevice, clear fluid | + | Heavy protective deposit, metallic app., tendency to crevice con., clear fluid |
| 17 | 130 | 5.3 | Sl. general attack, small amount PPt, tendency to crevice | ~0 | Protective deposit, tendency to crevice con., clear fluid | ~0 | Bright protective deposit, metallic app., clear fluid | + | Bright protective deposit, metallic app., tendency to crevice con., clear fluid |
| 18 | 138 | * | V. severe attack up to total loss, heavy PPT | 0.3 | V. sl. pit., crevice con., clear fluid | ~0 | Dark protective deposit, metallic app., clear fluid | + | Bright protective deposit, metallic app., tendency to crevice con., clear fluid |
| 18.6 | 141 | + | V. severe attack up to total loss, heavy PPT | 2.0 | Not uniform protective deposit, sl. | + | Dark protective deposit, metallic | + | Dark protective deposit metallic |

TABLE 3-continued

The influence of $As_2O_3$ Content on the Corrosion Behavior of St-37 Carbon steel After 30 Days of Exposure, in $Zn,Ca/Br_2$ Heavy Brine Solutions.

| Density of solution $\rho$ (ppg) | Boiling temper. t (°C.) | Corrosion Rate (mpy) | | | | | | | |
|---|---|---|---|---|---|---|---|---|---|
| | | 100 ppm | Remarks | 200 ppm | Remarks | 300 ppm | Remarks | 400 ppm | Remarks |
| | | | | | pit., crevice, clear fluid | | app., clear fluid | | app., tendency to crevice, clear fluid |

TABLE 2

Effect of Urea Addition on Corrosion Inhibition

| $As^{+z}$ ppm | $(NH_2)_2CO$ wt % | Temp. °C. | Corrosion rate (mpy) | Remarks |
|---|---|---|---|---|
| 650 | — | 177 | 10 | Pitt. Edge |
| 650 | — | 205 | 20 | " |
| 650 | 0.5 | 177 | 5 | Slight Pitt. |
| 650 | 1.0 | 177 | ~0 | Smooth |
| 650 | 0.5 | 205 | 5 | Slight Pitt. |
| 650 | 1.0 | 205 | ~1 | Smooth |

I claim:

1. A method for protecting carbon steel for use in oil wells from corrosion attack due to heavy clear brines corrosive behavior, comprising providing in the brine an inhibiting effective amount of $As^{+z}$ ion, the value of z being comprised between 1 and 5, alone or in admixture with about 0.5 wt% to about 1 wt% of urea.

2. A method according to claim 1, wherein the heavy clear brine is a $Zn,Ca/X_2$ brine, and X represents Br or Cl.

3. A method according to claim 1, wherein $As^{+z}$ is provided in an amount of at least 200 ppm.

4. A method according to claim 1, wherein the density of the brine is of about 23 pounds per gallon or less.

5. A method according to claim 4, wherein $As^{+z}$ is added in an amount of up to 1500 ppm.

6. A method according to claim 1, wherein the density of the brine is between about 14 and about 16 pounds per gallon.

7. A method according to claim 6, wherein $As^{+z}$ is added in an amount between about 100 and about 300 ppm.

8. A method according to claim 1, wherein the density of the brine is between about 16 and about 18 pounds per gallon.

9. A method according to claim 8, wherein $As^{+z}$ is added in an amount between about 300 and about 600 ppm.

10. A method according to claim 1, wherein the density of the brine is between about 18 and about 20 pounds per gallon.

11. A method according to claim 10, wherein $As^{+z}$ is added in an amount between about 600 and about 800 ppm.

12. A method according to claim 1, wherein $As^{+z}$ is generated in situ.

13. A method according to claim 1, wherein $As^{+z}$ is provided by adding a compound selected from among $As_2O_3$, $AsBr_3$, $Na_2AsO_3$ and $As_2O_5$ 14. A method according to claim 3, wherein $As^{+z}$ is generated in situ.

15. A method according to claim 5, wherein $As^{+z}$ is generated in situ.

16. A method according to claim 7 wherein $As^{+z}$ is generated in situ.

17. A method according to claim 9 wherein $As^{+z}$ is generated in situ.

18. A method according to claim 11 wherein $As^{+z}$ is generated in situ.

* * * * *